United States Patent
Leone

(10) Patent No.: US 7,600,651 B2
(45) Date of Patent: Oct. 13, 2009

(54) BAKING APPARATUS

(76) Inventor: Richard Leone, 427 Second St., Cloquet, MN (US) 55720

(*) Notice: Subject to any disclaimer, the term of this patent is extended or adjusted under 35 U.S.C. 154(b) by 376 days.

(21) Appl. No.: 10/792,026

(22) Filed: Mar. 2, 2004

(65) Prior Publication Data

US 2004/0182868 A1    Sep. 23, 2004

Related U.S. Application Data

(60) Provisional application No. 60/451,515, filed on Mar. 3, 2003.

(51) Int. Cl.
*A47J 37/01* (2006.01)
(52) U.S. Cl. .................................... 220/573.1
(58) Field of Classification Search .................. None
See application file for complete search history.

(56) References Cited

U.S. PATENT DOCUMENTS

| | | | | | |
|---|---|---|---|---|---|
| 1,061,431 | A | * | 5/1913 | West | 99/419 |
| 2,714,465 | A | * | 8/1955 | Blair | 220/6 |
| 2,969,011 | A | * | 1/1961 | Sperl | 99/419 |
| 4,589,333 | A | * | 5/1986 | Murphy | 99/419 |
| 4,724,753 | A | * | 2/1988 | Neyman et al. | 99/339 |
| 5,390,453 | A | * | 2/1995 | Untiedt | 52/90.1 |
| 5,628,245 | A | * | 5/1997 | Baze | 99/426 |
| 7,107,898 | B2 | * | 9/2006 | Sculuca | 99/421 A |

* cited by examiner

*Primary Examiner*—Stephen Castellano
(74) *Attorney, Agent, or Firm*—Kinney & Lange, P.A.

(57) ABSTRACT

A baking tray for baking food on a stick or skewer includes a base and support with at least one aperture. The open end of a stick that has been inserted into a food product is inserted into an aperture. The food product remains elevated off the baking surface such that the food product does not sustain any burning and grease drains off.

14 Claims, 3 Drawing Sheets

BAKING APPARATUS

This application claims the benefit under 35 U.S.C. § 119(e) of U.S. Provisional Application No. 60/451,515 filed on Mar. 3, 2003, for CORN DOG BAKING APPARATUS, which is incorporated by reference.

BACKGROUND OF THE INVENTION

The present invention relates to cookware. In particular, the invention is directed to a baking tray design.

Baking is a well known and commonly used cooking process. Many types of baking pans are available such as pie pans, cake pans, and cookie sheets. Whether in domestic or commercial situations, the baking process usually involves placing a food article to be baked in a pan or sheet, which is then placed in an oven and heated to the required temperature for the required period of time. Once baked, the pan or sheet must be removed from the oven and the food article removed from it.

Food products on sticks, such as corn dogs, are good examples where baking is the preferred method of heating the food but not cooking it. Present baking pans and sheets, however, are not optimal for baking these food. Placing the food article directly onto the tray can result in the food product becoming burnt if it is not watched carefully. Even if the entire food product is not burnt, many times the portion that is contacting the pan or sheet results in a burnt spot on the food product. The food products, thus, are less than satisfactory to eat. Therefore, there is a need for a better baking tray.

BRIEF SUMMARY OF THE INVENTION

The present invention is a baking tray for baking food on a stick. The baking tray has a base with a support attached to one end of the base. At least one aperture is present on the support for inserting sticks.

DETAILED DESCRIPTION

Figure 1:
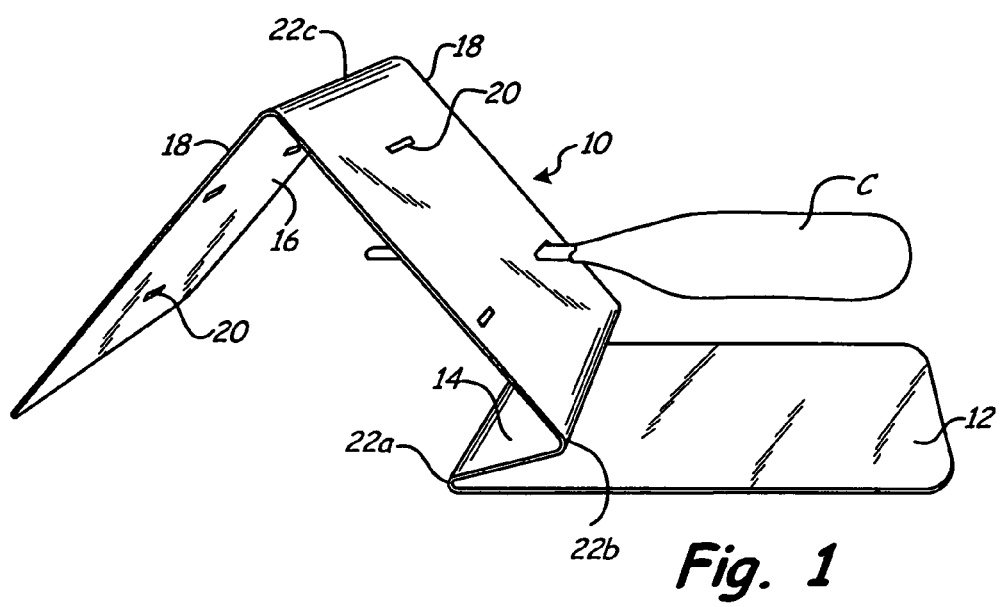
FIG. 1 is a perspective side view of the baking tray with corn dogs.

FIG. 1 shows the preferred embodiment of the present invention. FIG. 1 includes baking tray 10 and corn dogs C. Baking tray 10 further includes base 12, connector 14, support 16 with sloped sides 18 and apertures 20, and folds 22a, 22b, and 22c.

Connector 14 is attached to one side of base 12 such that connector 14 slopes above base 12. Support 16 is attached to the opposite side of connector 14 such that it is elevated above and off-center over base 12. Sloped sides 18 connect together at one end such that support 16 forms a tent-like structure. Apertures 20 are positioned along sloped sides 18. Fold 22a forms at the connection between base 12 and connector 14. Fold 22b forms at the connection between connector 14 and support 16. Fold 22c forms at the connection between sloped sides 18.

In operation, corn dogs C are placed in apertures 20. Apertures 20 preferably have an oval or diamond shape but can be any shape to accommodate a stick or skewer. For optimal stick strength, oval or diamond shaped apertures 20 are in a vertical orientation, however, apertures 20 may also be in a horizontal orientation or at angles in between. Baking tray 10 may be placed on another flat baking tray, but it is not necessary. Baking tray 10 is then placed in an oven, and corn dogs C are baked at the appropriate temperature for an appropriate amount of time.

Baking tray 10 elevates corn dogs C off the baking surface such that corn dogs C will not have a burnt spot from contacting a baking surface. In addition, corn dogs C can be baked for an extended period of time, beyond that which is recommended, and they will sustain no burning.

Another benefit of baking tray 10 is that corn dogs C are not baked in there own grease. Because they are suspended, the grease drips off as they bake. Conservatively, about 20%-50% more grease is removed from corn dogs C, or other foods baked using baking tray 10, than if baked on a conventional baking pan. This is a much healthier way of baking, rather than re-frying the food, while still maintaining the deep fried taste.

Many types of food products can be utilized with baking tray 10 including corn dogs, egg rolls, breaded fish fillets, breaded chicken chunks, and breaded jumbo shrimp. The only requirement is that a stick or skewer be inserted into the food product. Preferably, the stick or skewer is wood, because wood is a very inefficient conductor of heat. The food product will not be heated from the stick. Baking tray 10 does not reheat the food—it restores the food to its original state.

In the preferred embodiment, though it is not necessary, baking tray 10 can also be folded for easy storage. Hinges may be placed in one or more of folds 22a, 22b, and 22c, which allow baking tray 10 to be folded at those points. Thus, baking tray 10 becomes a compact size and shape to be easily stored away.

If hinges are not added, baking tray 10 is still stackable. Therefore, baking tray 10 is easy to ship and store.

Baking tray 10 is preferably comprised of oven-proof material such as aluminum or similar material. However, baking tray 10 may also be made of a material such that it could be used in a microwave oven or a material that could be used in both types of ovens.

Figure 2:
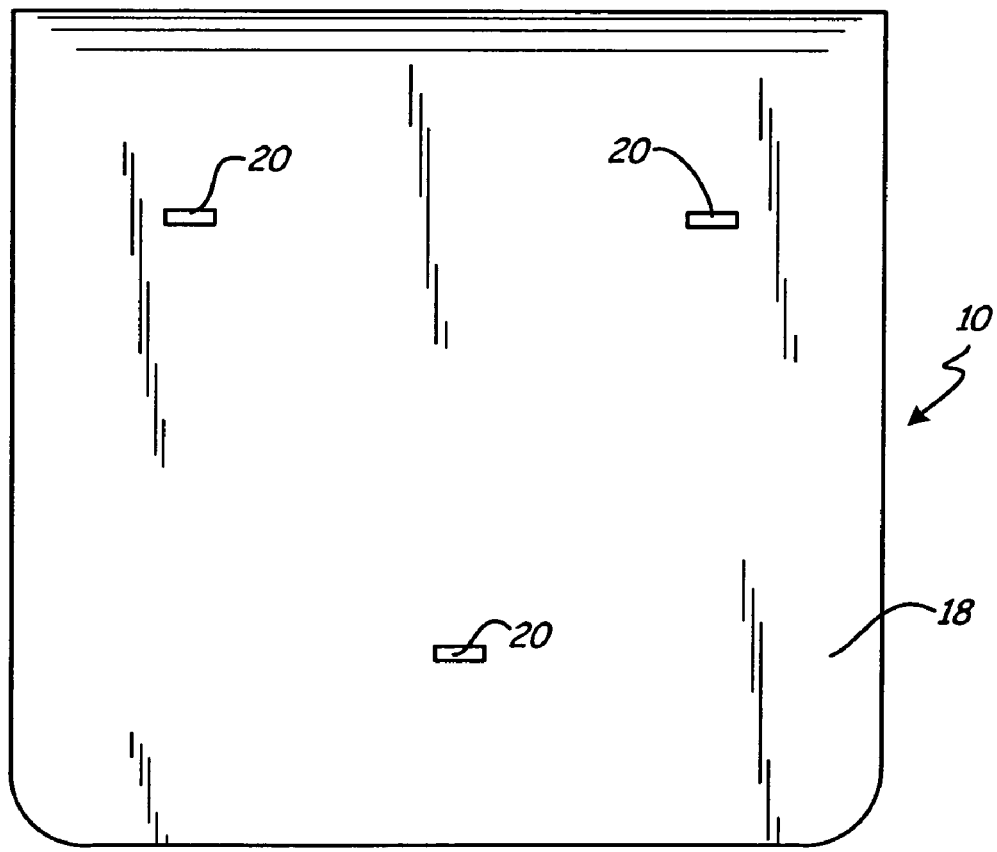
FIG. 2 shows a slope side of the baking tray with horizontally oriented apertures.

FIG. 2 shows one of sloped sides 18 in more detail. FIG. 2 includes baking tray 10 with sloped side 18 and apertures 20. In operation, the open end of a stick that has been inserted into a food product is inserted through aperture 20. At least one aperture 20 is present on sloped side 18.

Figure 3:
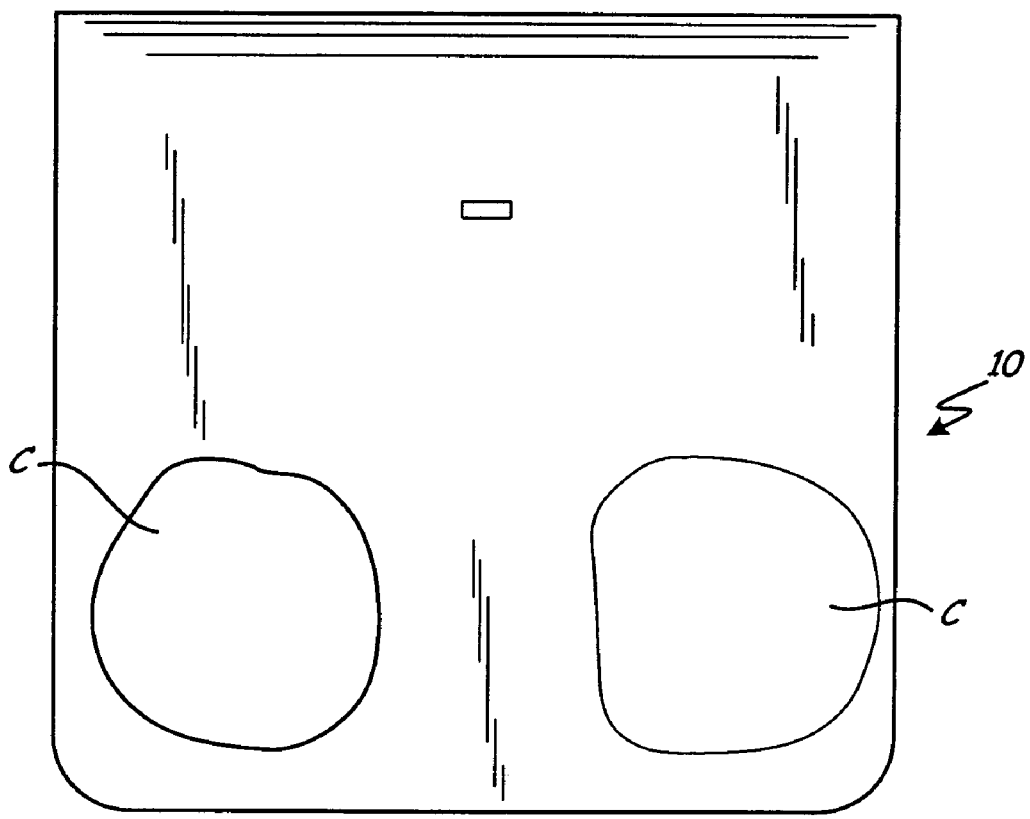
FIG. 3 is a perspective front view of the baking tray with corn dogs.

FIG. 3 shows the front of baking tray 10 having the sticks of corn dogs C inserted through apertures 20. In FIG. 3, an example of a horizontally oriented rectangular aperture is shown.

Although the present invention has been described with reference to preferred embodiments, workers skilled in the art will recognize that changes may be made in form and detail without departing from the spirit and scope of the invention.

The invention claimed is:

1. A baking tray for baking food on a stick or skewer, the baking tray comprising:
    a generally planar, horizontal base;
    a connector having a first end and a second end, wherein the first end is attached to an end of the base at a first bend and the connector and the base form an acute angle;
    a generally angled support having a first end and a second end, wherein the first end of the support is attached to second end of the connector at a second bend, the support slopes above the connector, and the support and the connector form an angle less than 180 degrees, and wherein the base, connector and angled support are one-piece and are one continuous, solid sheet; and at least one aperture on the support and spaced vertically from the base for inserting a stick or skewer, the aperture being positioned and configured to support food on the stick or skewer that is inserted into the aperture so that the stick or skewer is elevated above the base and generally horizontal and parallel to the base and the food is suspended in air and is not in contact with any surface of the baking tray.

2. The baking tray of claim 1 wherein the baking tray is comprised of an oven-proof material.

3. The baking tray of claim 2 wherein the baking tray is used in an oven.

4. The baking tray of claim 1 wherein the baking tray is used in a microwave oven.

5. The baking tray of claim 1 wherein the support forms an inverted V-shape having two inclined sloped sides forming an apex at an upper end, and the apertures are located on at least one of the sloped sides.

6. A device for supporting food on a stick or skewer during cooking, the device comprising:
  a generally horizontal base;
  a connector having a first end and a second end, wherein the first end is attached to an end of the base at a first bend and the connector and the base form an acute angle; and
  a support forming an inverted V-shape having first and second inclined sloped sides forming an apex at an upper end, wherein the first sloped side is attached to the second end of the connector at a second bend, the first sloped side slopes above the connector, and the first sloped side and the connector form an angle less than 180 degrees, and wherein the support has at least one spaced vertically from the base for receiving a stick or skewer carrying food, and supporting the stick or skewer and the food in a cantilevered fashion so that the food is not in contact with a heated surface during cooking, wherein the base, the connector and the support are one-piece and are an integral sheet metal structure.

7. The device of claim 6, wherein the base and the support are comprised of an oven-proof material.

8. The device of claim 6, wherein the support is positioned to support the food generally parallel to the base.

9. The device of claim 6, wherein the support is positioned to support the food above the base.

10. The device of claim 6, wherein the support includes a plurality of apertures spaced from one another to support a plurality of sticks or skewers carrying food generally parallel to one another.

11. A baking tray for baking food on a stick or skewer, the baking tray comprising:
  a one-piece, continuous, solid metal sheet comprising:
    a generally planar, horizontal base;
    a first planar surface comprising a first end and a second end, wherein the first end is attached to an end of the base at a first bend and the first planar surface and the base form an acute angle;
    a second planar surface comprising a first end, a second end and an aperture, wherein the first end of the second planar surface is attached to the second end of the first planar surface at a second bend, the second planar surface slopes above the first planar surface, and the second planar surface and the first planar surface form an angle less than 180 degrees, and wherein the aperture is spaced vertically from the first end of the second planar surface and is configured to receive a stick or skewer; and
    a third planar surface comprising a first end and a second end, wherein the first end of the third planar surface is attached to the second end of the second planar surface at a third bend and the second and third planar surfaces form an inverted V-shape.

12. The baking tray of claim 11, wherein the third planar surface has at least one aperture configured to receive a stick or skewer and configured to support food on the stick or skewer so that the food is not in contact with any surface of the baking tray.

13. The baking tray of claim 12, wherein the apertures of the second and third planar surfaces are positioned and configured to receive and support the stick or skewer in a generally horizontal position and parallel to and above the base.

14. The baking tray of claim 1, wherein the continuous, solid sheet is a metal.

* * * * *

UNITED STATES PATENT AND TRADEMARK OFFICE
CERTIFICATE OF CORRECTION

PATENT NO. : 7,600,651 B2  Page 1 of 1
APPLICATION NO. : 10/792026
DATED : October 13, 2009
INVENTOR(S) : Richard Leone It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Fifth Day of October, 2010

David J. Kappos
*Director of the United States Patent and Trademark Office*